April 9, 1968  G. A. ROBERTS  3,376,746
ELECTRICAL CIRCUIT FOR CAPACITOR PROBE
Filed May 14, 1965  2 Sheets-Sheet 1

INVENTOR.
GORDON A. ROBERTS
BY
Woodhams, Blanchard & Flynn
ATTORNEYS

April 9, 1968  G. A. ROBERTS  3,376,746
ELECTRICAL CIRCUIT FOR CAPACITOR PROBE
Filed May 14, 1965  2 Sheets-Sheet 2

INVENTOR.
GORDON A. ROBERTS
BY
Woodhams, Blanchard & Flynn
ATTORNEYS

United States Patent Office 3,376,746
Patented Apr. 9, 1968

3,376,746
ELECTRICAL CIRCUIT FOR CAPACITOR PROBE
Gordon A. Roberts, Ann Arbor, Mich., assignor to Charles F. Warrick Company, Berkley, Mich., a corporation of Michigan
Filed May 14, 1965, Ser. No. 455,892
13 Claims. (Cl. 73—304)

This invention relates to an impedance measuring circuit and more particularly relates to an unbalanced current bridge circuit which provides a linear transfer function between an input variable and an output term with the degree of linearity being readily controllable.

The present invention was developed for use with capacitive liquid level probes but is, however, at least in its broader aspects, fully applicable to other uses including liquid conductance measurements and a variety of types of impedance measurements.

Briefly, the present invention provides an unbalanced current bridge circuit including an impedance to be measured in one leg and a shunt of substantially lower impedance across the output terminals. The current flow through the shunt is a linear function of the admittance to be measured to the extent that the shunt impedance is negligible compared to the impedance to be measured.

In the following discussion, a bridge will be considered to have at least four legs connected serially to form a closed path and an output center leg connected across a series pair of outer legs.

It has been common in the past to measure impedances by using a simple balanced bridge in which adjustment of variable impedances placed in the outer legs of the bridge produces a zero voltage or null across the center leg of the bridge and, by definition, balances the bridge. In such a circuit, the values to which the variable impedances are adjusted to balance the bridge provide a measure of the impedance to be measured. Such a circuit, however, requires adjustment by some agency in order to make a measurement. In its more rudimentary forms, such adjustment is made by a human operator and such bridges are suited for one-shot measurements of fixed impedances rather than for producing a continuous reading of a continuously changing test impedance.

Such balanced-type bridges have in the past been supplied with feedback devices of various types, including electromechanical and purely electrical types, capable of sensing a departure of the bridge from null and of maintaining the bridge substantially in a balanced condition despite relatively wide variations in the test impedance. Generally, the feedback means change the setting of variable impedances in the outer legs in order to maintain, as closely as possible, the null condition.

Thus, the feedback means simply takes the place of a human operator although it may act more quickly or maintain the null within closer bounds. In fact, the quality of the balanced-type circuit, in terms of the accuracy with which it is able to continuously measure a changing test impedance, is a function of how closely the null condition is maintained. A disadvantage is that practical circuits of this type are generally complex due to the feedback mechanism and, hence, are expensive in comparison to a simple nonfeedback impedance bridge.

It has been recognized in the past, therefore, that the broad concept of operation of a bridge in an unbalanced condition might be advantageous for continuously measuring changing test impedances, no feedback means being required since variable control impedances and a continuous null would not be required. In such an unbalanced-type bridge, it is the intent that the degree of unbalance measured by the change in the voltage drop across the center leg of the bridge be a predictable function of the change in the test impedance to be measured.

In the past, therefore, the center or output leg of the bridge was a high impedance, often in the same range as or higher than a typical value of the test impedance in order to maintain a relatively high output voltage. A high output voltage has been considered desirable for providing relatively large output voltage changes for relatively small changes in the test impedance, i.e., for providing good bridge sensitivity. Accordingly, it has previously been acceptable, for example, to place the relatively high input impedance of a conventional vacuum tube amplifier across the center or output leg of unbalanced bridges.

Thus, such prior unbalanced bridge circuits are intended to operate with a substantial voltage imbalance, hence, a substantial output voltage appearing across the center leg thereof.

However, it is known that such prior unbalanced bridge circuits do not have a linear transfer function between the output voltage and the input admittance change and would therefore require calibration curves which would make them unsatisfactory for use in many applications, particularly where the electrical output is coupled into a process control system.

Accordingly, the objects and purposes of this invention include:

(1) To provide an unbalanced current bridge circuit having a linear transfer function between an input variable and an output term with the degree of linearity being readily controllable.

(2) To provide a current bridge circuit, as aforesaid, which normally operates in an unbalanced condition, which provides substantially unimpeded current flow across its center, output leg and in which such current flow can be made a linear function of the admittance change to be measured.

(3) To provide a current bridge circuit, as aforesaid, in which the center output leg comprises a current conductive shunt of impedance negligible in comparison to the impedance to be measured.

(4) To provide a current bridge circuit, as aforesaid, which requires no feedback devices of any kind for use in changing the condition of bridge balance.

(5) To provide a current bridge circuit, as aforesaid, in which the desired measurement is independent of the frequency of the voltage source energizing the bridge circuit.

(6) To provide a current bridge circuit, as aforesaid, which allows independence of measurement of reactive and resistant terms in which the means across the center output leg of the bridge includes a phase detector and which is particularly adapted to use solid state components.

(7) To provide a current bridge circuit, as aforesaid, which was particularly developed for measuring capacitance and in which the relationship between the change in test capacitance and the output of the phase detector can be made to closely approach perfect linearity in practical circuits.

(8) To provide a curent bridge circuit, as aforesaid, in which the zero adjustment is independent of the span adjustment.

(9) To provide a current bridge circuit, as aforesaid, which is particularly adapted for measuring the change in capacitance of capacitance type liquid level probe, which can be made to automatically compensate for the liquid dielectric constant for the liquid being measured.

(10) To provide a current bridge circuit, as aforesaid, which can be manufactured at a relatively low cost of readily available, standard components, which is simple but accurate, stable and easily adjustable, which can be made with a relatively wide admittance span range, relatively wide zero set range, and which can be made with linearity much better than 1% and overall accuracy and stability of 1%.

(11) To provide a current bridge circuit, as aforesaid, which can be made in a simplified form at extremely low cost while still providing some of the desirable features of more complex systems embodying the invention.

Other objects and purposes of this invention will be apparent to persons acquainted with apparatus of this general type upon reading the specification and inspecting the accompanying drawings.

In general, the objects and purposes of the invention are met by providing an unbalanced current bridge circuit for providing an output linearly related to an admittance change. The circuit includes four outside legs connected to form a closed loop and a center, output leg connected across two adjacent ones of the outside legs. A voltage source energizes one of the two legs and a test impedance is disposed in the other. A further voltage source energizes one of the remaining legs and a second control impedance is disposed in the last leg, variation of the test impedance varying the balance of the bridge. A phase sensing device is connected across the center output leg of the bridge, such device providing low impedance shunt across the output terminals of the bridge for allowing substantially unimpeded current flow through said center leg and providing an output related to such current flow, the linearity of the change in such current flow being linearly related to test admittance change when the admittance of such center leg is sufficiently large.

*Detailed description*

Figure 1:
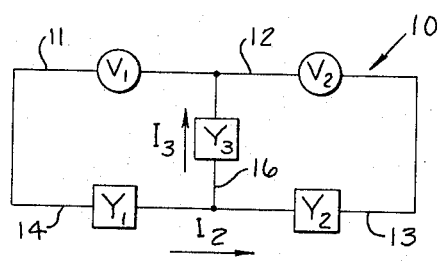
FIGURE 1 is a block diagram of a circuit type which can be made in accordance with the invention.

Turning now to the drawings, FIGURE 1 is a block diagram which can be used to represent the general arrangement of a bridge type measuring circuit embodying the invention. Thus, in FIGURE 1, alternating voltage sources $V_1$ and $V_2$ are located in bridge legs 11 and 12 and admittances $Y_1$ and $Y_2$ are located in bridge legs 14 and 13, respectively, said legs being connected in series to form a closed loop. As shown in FIGURE 1, the voltage sources $V_1$ and $V_2$ are adjacent each other. However, it is contemplated that one of the impedances may be placed therebetween, for example, by interchanging the positions of one of the voltage sources and one of the admittances. An output admittance $Y_3$ is placed in a diagonal or center leg 16 of the bridge. The center output leg 16 is connected diagonally across the bridge 10 in such a way that one voltage source-admittance pair is on one side thereof and the other voltage source-admittance pair is on the other side thereof.

Figure 2:
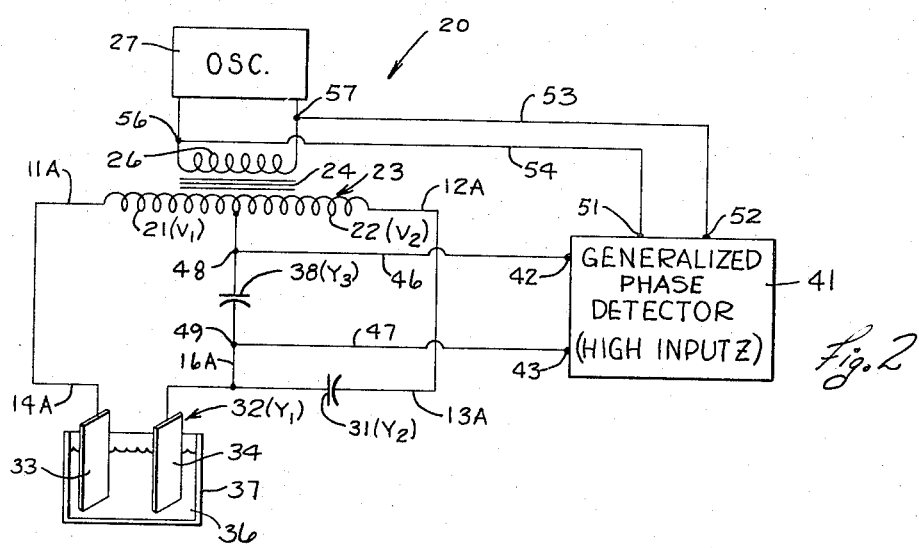
FIGURE 2 is an impedance measuring bridge circuit particularly adapted to use in measuring capacitive reactances and embodying the invention.

FIGURE 2 illustrates an unbalance bridge 20 embodying the invention and which corresponds in general arrangement to the block diagram of FIGURE 1. Parts of the circuit 20 corresponding to parts of the block bridge 10 will be indicated by the same reference numerals thereas with the suffix A added thereto. Thus, the circuit 20 includes outer bridge legs 11A, 12A, 13A and 14A and a center, output bridge leg 16A. The legs 11A and 12A include the opposite halves 21 and 22 of the secondary winding 23 of a voltage transformer 24. The primary winding 26 of the transformer 24 connects from an output of an oscillator 27 preferably having a constant voltage, sinusoidal output. In the partial embodiment shown, an audio-frequency oscillator 27 was employed. The oscillator 27 may be of any convenient type such as that disclosed in my copending application Ser. No. 455,839. A capacitor 31 is provided in the leg 13A and corresponds to the admittance $Y_2$ of FIGURE 1. The bridge leg 14A is provided with a capacitance 32 to be measured which is shown for purposes of illustration to be a capacitive liquid level probe. More particularly, the capacitive probe 32 comprises a pair of plates 33 and 34 which extend downwardly into a body of dielectric liquid 36 disposed in a suitable reservoir 37. The plates 33 and 34 are preferably parallel and arranged so that a change in the level of the liquid will result in a corresponding change in the length of the plates immersed in the liquid and, hence, in a corresponding change in the capacity of the probe 32.

Turning now to the center output leg 16A of the circuit 20, recall that it is a primary object of the present invention that a linear relationship exist between the output of the circuit and the variation of the admittance to be measured. Thus, it is desired that the change in capacitance of the probe 32 lead to a condition in the center output leg 16A which is a linear function thereof. In the present invention, such a linear transfer function is at least theoretically achieved and in practice at least very closely approached by the use of a current sensor in the center output leg 16A of the bridge. Broadly speaking, it is desired to make center output leg 16A a current shunt across the legs 11A and 14A and hence the legs 12A and 13A of the circuit 20. Thus, it is desired that the leg 16A impede the flow of current therethrough as little as is practically possible. In other words, the admittance $Y_3$ is to be made large as possible such that the test admittance $Y_1$ is negligible in comparison thereto. In the circuit 20, the admittance $Y_3$ preferably takes the form of the shunt output capacitor 38 having a value of capacitance substantially in excess of the difference between the capacitances 31 and 32. The following derivation demonstrates both that an error in linearity, that is, a departure of the transfer function of the circuit from linearity, exists when the output admittance $Y_3$ is relatively low compared to the test admittance $Y_1$ and that the error can be made to approach zero as the admittance of the center output leg 16A increases and approaches infinity.

The following derivation is for a bridge such as that of the circuit 20 with two voltage sources corresponding to $V_1$ and $V_2$ of FIGURE 1 and in which the admittance $Y_1=wC_1$, $Y_2=0$ and $Y_3=wC_3$ wherein $C_1$ is the capacitance of the probe 32, $C_3$ is the capacitance of the output shunt capacitor 38 and $w=2\pi f$ where $f$ is the frequency of the oscillator 27. The error in the linearity of the transfer function, that is, the function relating the change of the capacitance of the probe 32 with the change in the current flow through the center leg 16A, can be found as a function of a parameter N wherein the parameter $N=C_3/C_{1F}$, $C_{1F}$ being the full scale or maximum value of the variable capacitance $C_1$ of the probe 32. The worst linearity error for a purely capacitive bridge with a shunt output capacitor of value $C_3$ and a full scale change in capacitance of $C_{1F}$ where $C_2$ is some arbitrary fixed capacitance, here zero, will be found.

In general, the output of the bridge circuit for an unbalanced input will be of the form:

$$I = a \frac{C_1}{1 + \frac{C_1}{C_3}}$$

If $C_3$ approaches $\infty$, then this form reduces to $$I = aC_1$$

This is the desired theoretically linear relationship between the input variable $C_1$ and the output measure $I$. It is now desired to take the theoretically linear relationship and the actual transfer function and equate these at full scale and then determine the actual maximum difference between them. To do this, the following associations are made:

Let $x = C_1$, the theoretical case.
Let $$y = k \frac{C_1}{1 + \frac{C_1}{C_3}}$$

the actual case, in which $k$ is a scale factor, then $x$ and $y$ can be equated for $C_1 = C_{1F}$.

Let the variable $z = C_1$ in the above relations to clarify that $C_1$ is a variable so $$x = z \quad (1)$$

$$y = k \frac{z}{1 + \frac{z}{C_3}} \quad (2)$$

To evaluate the linearity error, Equations 1 and 2 are equated when $z = 0$ and when $$z = \frac{C_3}{N}$$

Solving for $k$, $$x = y$$

$$z = k \frac{z}{1 + \frac{z}{C_3}}$$

$$k = 1 + \frac{z}{C_3} = 1 + \frac{1}{N}$$

$$k = \frac{N+1}{N} \quad (3)$$

This establishes the scale factor $k$ so that both the precisely linear and practical circuits will have the same full scale output. Having so scaled the equations, the maximum difference between them can be found.

$$x - y = z - \left[ \left( \frac{N+1}{N} \right) \left( \frac{z}{1 + \frac{z}{C_3}} \right) \right]$$

$$x - y = \frac{Nz^2 - C_3 z}{N(C_3 + z)} \quad (4)$$

By differentiating this with respect to $z$ and equating to zero, the maximum point is found to be $$z_{\text{max. error}} \left[ \left( 1 + \frac{1}{N} \right)^{1/2} - 1 \right] \quad (5)$$

Now substituting (5) into (4), the maximum error is $$\text{Max. error} = (x - y)_{\text{max.}} = C_3 \left[ 2\left(1 + \frac{1}{N}\right)^{1/2} - \left(2 + \frac{1}{N}\right) \right] \quad (6)$$

In effect, $N$ is the ratio of the source voltage to the full scale output voltage across the capacitive shunt $C_3$.

For various values of $N$, we have the following percent of full scale linearity errors:

$$\text{Fractional error}_{\text{max.}} = \frac{(x-y)_{\text{max.}}}{C_3/N}$$

$$\text{Percent error}_{\text{max.}} = \frac{(x-y)_{\text{max.}}}{C_3/N} \times 100$$

| N | Fractional Error max. | Percent Error max. | Percent Full Scale for max. error |
|---|---|---|---|
| 1 | .1716 | 17.16 | 41.42 |
| 2 | .1010 | 10.10 | 44.45 |
| 5 | .0455 | 4.55 | 47.72 |
| 10 | .0238 | 2.38 | 48.81 |
| 20 | .0122 | 1.22 | 49.39 |
| 40 | .00618 | .62 | 49.69 |
| 50 | .00500 | .50 | 49.75 |
| 100 | .00240 | .24 | 49.88 |

The importance of these particular results and this example is that a practical value of the shunt impedance can be selected that will provide adequate output signal and yet which will allow good linearity to be achieved. Even though this example was for the simplified case of capacitance only, it is similar to that which would be achieved in bridges with more complex admittance terms. In general, for a given maximum linearity error one can find a $Y_3$ such that the desired linearity error will not be exceeded. Suppose that one is building an instrument to have 1% overall error and that the linearity error is to be held below ¼%, then it can be seen for this example that $C_3$ should be selected so that $N$ is greater than 100 or that the full scale output occurs for a voltage across $C_3$ which is less than 1/100 times the source voltage in one leg.

In a practical capacitance bridge, or more broadly speaking in a bridge circuit in which the admittances have conductive components, conductance here being taken in its usual sense as inverse resistance, the output current flowing in the output leg 16A of the bridge will include components of different phase. In the circuit of FIGURE 2, for example, the bridge output current flowing through the capacitor 38 will generally include a desired component whose magnitude depends on changes in the capacitance of the probe 32 and a quadrature component due to spurious resistances in series or parallel with the probe. Therefore, to obtain the desired capacitance-dependent component of the current through the output shunt capacitance 38, the input terminals 42 and 43 of a generalized phase detector 41 of any desired type, having an input impedance which is high with respect to the impedance of the capacitor 38, are connected by suitable conductors 46 and 47 to terminals 48 and 49 on opposite sides of the capacitor 38. A particular example of such a phase detector is discussed hereinafter with respect to FIGURE 3. The phase detector 41 has a pair of reference input signal terminals 51 and 52 which are connected through conductors 53 and 54 to terminals 56 and 57 at opposite ends of the primary winding 26 of the transformer 24 and hence to the output of the oscillator 27. Thus, the phase detector compares the reference voltage across the terminals 56 and 57 with the voltage across the shunt output capacitor 38 and reads out the desired component due to the capacitive probe 32 while rejecting the quadrature component due to spurious resistance in the circuit.

It will be noted here, that the use of a capacitor such as the capacitor 38 as the output admittance of the bridge is desirable at least for two reasons. First, with the oscillator 27 as the phase reference signal for the phase detector 41, the shunt capacitor 38 provides the correct phasing to the signal applied to the phase detector so that the resistive quadrature component is cancelled out rather than the capacitive signal component. More particularly, the capacitor 38 provides a 90° phase shift between the capacitive component of bridge current flowing therethrough and the voltage drop thereacross which places the capacitive output voltage component in phase with the voltage from the oscillator.

Secondly, the use of a capacitive type output shunt renders the voltage drop across capacitor 38 independent of the frequency of the oscillator 27 as readily seen below.

The current through the capacitive shunt is:

$$I_3 = \frac{V_1 Y_1 - V_2 Y_2}{1 + \frac{Y_1}{Y_3} + \frac{Y_2}{Y_3}}$$

Assuming that $V_1$ and $V_2$ are equal in magnitude and that $Y_3$ is large compared to $Y_1 + Y_2$, then this reduces to $$I_3 = V_1 = \frac{Y_1 - Y_2}{1}$$

Let $\Delta C_1$ be the bridge unbalanced capacitance. Then $$I_3 = V_1 j w \Delta C_1$$

Let $V_3$ be the voltage drop across the capacitive shunt, then $$V_3 = \frac{I_3}{Y_3} = \frac{jw \Delta C_1}{jwC_3} = \frac{\Delta C_1}{C_3}$$

Thus, the voltage across the capacitive shunt is independent of frequency for capacitive unbalance.

The following analysis of the general bridge circuit of FIGURE 1 reveals the nature of the current flowing through $Y_3$. The admittances Y will refer to general admittances consisting of resistive and reactive terms, admittance being the reciprocal of impedance.

The loop equations are:

$$V_1 + V_2 = I_2\left(\frac{1}{Y_1} + \frac{1}{Y_2}\right) + I_3\left(\frac{1}{Y_1}\right) \quad (1)$$

$$V_1 = I_2\left(\frac{1}{Y_1}\right) + I_3\left(\frac{1}{Y_1} + \frac{1}{Y_3}\right) \quad (2)$$

Solving these for $I_3$, $$I_3 = \frac{\begin{vmatrix} \frac{1}{Y_1} + \frac{1}{Y_2} & V_1 + V_2 \\ \frac{1}{Y_1} & V_1 \end{vmatrix}}{\begin{vmatrix} \frac{1}{Y_1} + \frac{1}{Y_2} & \frac{1}{Y_1} \\ \frac{1}{Y_1} & \frac{1}{Y_1} + \frac{1}{Y_3} \end{vmatrix}} = \frac{V_1 Z_2 - V_2 Z_1}{Z_1 Z_2 + Z_1 Z_3 + Z_2 Z_3} \quad (3)$$

$$= \frac{V_1 Y_1 - V_2 Y_2}{1 + \frac{Y_1}{Y_3} + \frac{Y_2}{Y_3}} \quad (4)$$

Equation 4 is an exact equation for the unbalance current. The output voltage across $Y_3$ is of course $$V_{out} = V_{48,49} = \frac{I_3}{Y_3} \quad (5)$$

Assume for practical purposes that $Y_3$ is large compared to $Y_1 + Y_2$, then 4 is approximated by $$I_3 \cong V_1 Y_1 - V_2 Y_2 \quad (6)$$

$$V_{out} \cong V_1 \frac{Y_1}{Y_3} - V_2 \frac{Y_2}{Y_3} \quad (7)$$

Further assume that $Y_3 = jwC_3$, and that $Y_1 = G_1 + jwC_1$ and $Y_2 = G_2 + jwC_2$, where $G_1$ and $G_2$ are conductances, and for simplicity $V_1 = V_2$, our capacitive shunt case, then $$V_{out} \cong V_1 \left[\frac{C_1 - C_2}{C_3} + j\frac{G_2 - G_1}{wC_3}\right] \quad (8)$$

Note in 8 that $V_{out}$ has a term which is in phase with $V_1$, that is, linearly related to the difference between $C_1$ and $C_2$, is independent of $w$, and whose scale factor is determined by $V_1$ and $C_3$. Note further that the capacitive and resistive terms are in perfect quadrature for all values of bridge unbalance (at least within the constraint of the assumption that $Y_1 + Y_2$ is small compared to $Y_3$). Thus, the use of a phase detector allows us to measure either the resistive or capacitive term independent of the other.

It should be noted that this arrangement is of particular importance in capacitive liquid level applications. $C_1$ can be a vertical probe whose capacitance varies linearly with level but for some particular design level which is to be the reference zero level the value of $C_1$ is $C_0$. By making $C_2 = C_0$ it is then possible to get zero output at this reference zero level. Note that full scale calibration is then easy to make, independent of the zero adjustment, by adjusting $V_1$, or $C_3$, or the gain of the generalized phase detector. If, instead of using a capacitive shunt, a resistive shunt is used, and let $Y_3 = G_3$ with $Y_1$ and $Y_2$ being of the form $G + jwC$ and for simplicity $V_1 = V_2$, then $$V_{out} \cong V_1 \left[\frac{G_1 - G_2}{G_3} + j\frac{wC_1 - wC_2}{G_3}\right] \quad (9)$$

Now the same comments apply but speaking of conductance instead of capacitance. This form of the bridge is especially useful for liquid conductivity measurements.

*Operation*

Although the operation of the embodiment of FIGURE 2 has been disclosed somewhat hereinabove, it will briefly be summarized to insure a more complete understanding of the invention.

Briefly, the oscillator 27 provides an alternating current flow by means of the transformer 24 through the legs 11A and 12A of the circuit and, hence, through the legs 13A and 14A. The voltage across the secondary halves 21 and 22 is conveniently identical and ordinarily of a stable value and, hence, the voltage drop across the capacitors 31 and 32 will be identical when such capacitors are equal. Under such conditions, the current through the center output leg 16A will be zero. Thus, proper selection of the capacitor 31 allows the output of the bridge to be zero at a desired liquid level in the reservoir 37 at which the capacitance of the probe 32 is equal to the capacitance of the standard capacitor 31. The maximum change in capacitance of the probe 32 from the value of the standard capacitor 31 in either direction can then be easily made to correspond to a desired output of the circuit independently of the zero adjustment by variation of the magnitude on the source voltage appearing across the secondary 23, by variation of the value of capacitance 38 or by varying, in some manner, the sensitivity or gain of the phase detector. As the liquid level changes, the effective dielectric constant of the probe 32 will change accordingly and, as a result, the capacitance thereof will change in a corresponding manner. As the capacitance changes the bridge becomes unbalanced. As a result, current flows through the center leg 16a, the capacitor 38 as aforementioned providing the least possible impedance to such flow, such current flow thus being maximized within the limits of the source voltage and the values of the capacitors 31 and 32. Since the current flow through the output leg 16A is substantially uninfluenced thereby, the relationship of the capacitance current component to the capacitance of the probe 32 will be substantially linear. The voltage drop across the capacitor 38 is thus necessarily very small in comparison to the input voltage across the secondary 23 and such is transferred by the lines 46 and 47 to the signal input terminals of the phase detector. The reference voltage from the oscillator causes the phase detector to reject resistive components of the input thereto since these are in quadrature phase relation with the oscillator reference signal. The phase detector passes and measures, by any suitable means such as a suitable meter or meters therein, the capacitive component of output current flow in the center leg 16A of the bridge.

Modifications

Figure 3:
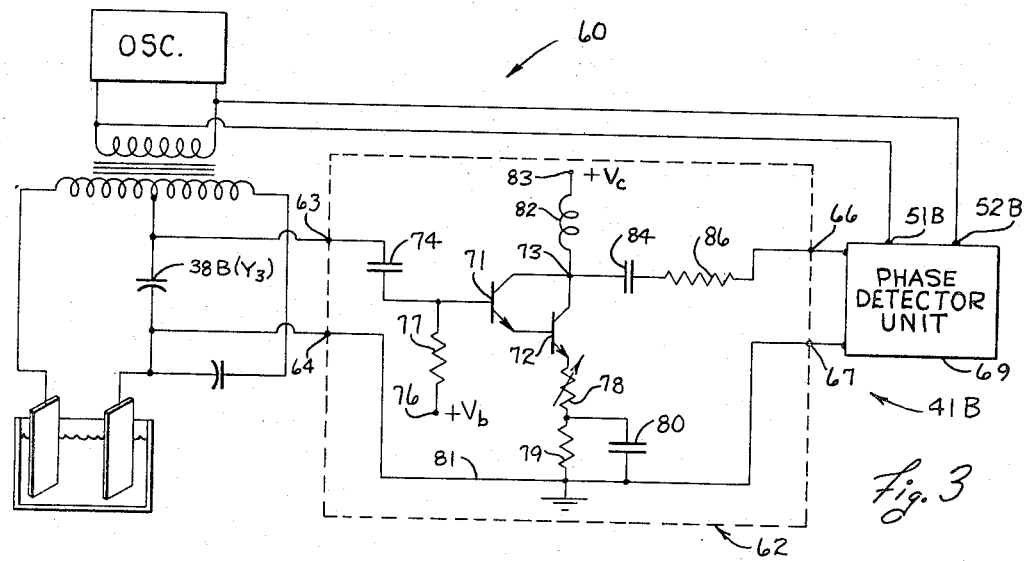
FIGURE 3 is substantially similar to FIGURE 2 except that a voltage to current amplifier is added to the output portion of the measuring circuit.

FIGURE 3 discloses a particular example of the basic circuit 20 of FIGURE 2. Parts of the circuit 60 of FIGURE 3 corresponding to parts of the circuit 20 of FIGURE 2 will be referred to by the same reference numerals thereas with the suffix B added thereto. FIGURE 3 differs from FIGURE 2 in disclosing a particular type of generalized high input impedance phase detector indicated at 41B. The generalized phase detector 41B includes an amplifier 62, the input terminals 63 and 64 of which are connected to opposite sides of the capacitor 38B for amplifying the output voltage across the capacitor 38B. The amplifier 62 has a high input impedance so as not to influence current flow through the capacitor 38B.

The output terminals 66 and 67 of the amplifiers 62 are connected to the corresponding signal input terminals of a phase detector unit 69. The phase detector unit 69 has reference input terminals 51B and 52B across which is imposed the oscillator output. The phase detector unit 69 may be of any convenient type. If desired, a phase detector unit having a low signal input impedance may be used since the amplifier 62 in effect isolates the input of the phase detector unit from the capacictor 38B. Should a current type phase detector unit 69 be used as is the type disclosed in my aforementioned copending application Ser. No. 455,839, the amplifier 62 is preferably of the type having a current output independent of the magnitude of the load imposed thereon by the phase detector as discussed in my aforementioned application. The particular amplifier 62 hereinafter described comprises a particular example included for purposes of illustration of an amplifier which may be used in the circuit 60.

The amplifier 62 includes a pair of transistors 71 and 72 connected in cascade. More particularly, the emitter of the leftward transistor 71 feeds the base of the transistor 72 and the collectors of the transistors 71 and 72 are connected to a common point 73. The base of the leftward transistor 71 connects through a D.C. blocking capacitor 74 to the input terminal 63 of the amplifier. If no D.C. current flows through the bridge, the capacitor 74 may be shorted if desired. Base bias is furnished the transistor 71 from a suitable D.C. voltage source 76 through a relatively high resistance 77.

The emitter of the transistor 72 connects through a variable resistance 78 and fixed resistance 79 to a ground potential line 81 which is in turn connected to the lower input terminal 64 and lower output terminal 67 of the amplifier 62. A capacitor 80 shunts the resistance 79. The common collector point 73 is connected through a choke 82 to a D.C. voltage supply point 83, the D.C. potential on the point 76 being intermediate that of the collector supply point 83 and ground line 81. The collector common point 73 is also connected through a D.C. blocking capacitor 84 and resistance 86 to the upper output terminal 66 of the amplifier 62.

To briefly summarize the operation of the particular amplifier circuit 62 shown, the current flowing in the capacitor 38B gives rise to a relatively small voltage drop thereacross. This voltage drop is applied to the base emitter circuit of the relatively high input impedance of the cascade amplifier comprising the transistors 71 and 72. The output signal of the amplifier appears across the terminals 66 and 67. The capacitors 74 and 84 are provided to prevent D.C. voltages from the D.C. source points 76 and 83 from appearing across the capacitor 38B or across the signal input of the phase detector unit 69. The inductor 82 provides a direct D.C. path between the supply point 83 and point 73 while providing A.C. isolation therebetween. Variation of the resistor 78 changes the gain of the amplifier 62 and thus provides simple adjustment for the span range of the bridge circuit.

Figure 4:
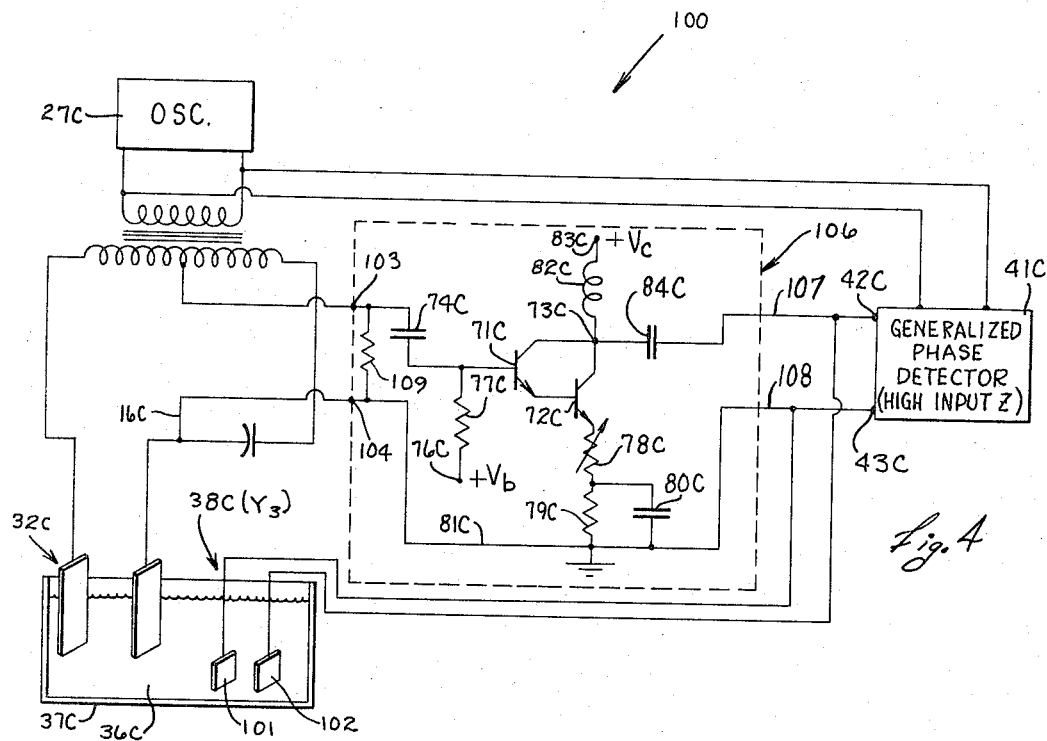
FIGURE 4 is a schematic diagram of a circuit embodying the invention and capable of providing automatic dielectric compensation in liquid level measurements.

FIGURE 4 illustrates an embodiment of the invention in which the capacitive shunt is no longer connected directly across the output of the bridge circuit as in FIGURES 2 and 3 above described but rather is located at the output of the current amplifier, the current amplifier isolating the capacitive shunt from the bridge and allowing various useful features to be achieved. The circuit 100 of FIGURE 4 is particularly useful as an output circuit for a capacitive liquid level probe. Portions of the circuit 100 corresponding to portions of the circuit 20 of FIGURE 2 will be designated by the same reference numerals thereas with the suffix C added thereto. Considering the circuit 100 in more detail, same differs from the circuit 20 of FIGURE 2 in that no capacitor corresponding to the capacitor 38 is directly connected in the center leg 16C of the circuit 100, the center leg rather being shunted by the input terminals 103 and 104 of a current amplifier 106. A current amplifier can be defined as one in which the output current is functionally related to the input current. Again as in the above-mentioned circuits 20 and 60, the admittance occurring across the output bridge should be high with respect to the differential admittance of the bridge legs. The output terminals 107 and 108 of the current amplifier 106 are connected to the signal input terminals 42C and 43C of the generalized high input impedance phase detector 41C.

A particular circuit for the current amplifier 106 is shown in detail for purposes of illustration although it will be understood that the invention is not limited to the particular amplifier circuit shown. The amplifier 106 is in the particular embodiment shown, similar to the amplifier 62 above described with several important exceptions. Hence, parts corresponding to the amplifier of FIGURE 3 will be designated by the same reference numerals thereas with the suffix C added thereto and in general will need no further description.

It will be noticed first of all that a relatively low resistance 109 is connected across the input terminals 103 and 104 of the current amplifier 106 to provide a low input impedance and, hence, a high admittance path through the center leg 16C of the bridge. Further, the resistance 86 in the amplifier 62 is omitted in the amplifier 106 since resistance 86 is used primarily as a parasitic suppressor and is not generally needed in the amplifier 106.

In the particular embodiment shown, a capacitor 38C is connected across the output terminals 107 and 108 of the current amplifier 106 and takes the place of the capacitor 38 connected across the bridge output in FIGURE 2. The current amplifier 106 here acts as an impedance transforming device. Thus, the amplifier 106 allows the capacitor 38C to be relatively small in capacitance and admittance and, hence, relatively high in impedance at the frequency of the oscillator 27C while still maintaining a substantially low impedance current shunt in the output leg 16C. Further, since the capacitance 38C may be relatively small, its physical size may be kept relatively small. As a result, it is practical to form the capacitor 38C as a further capacitance probe totally immersed in the liquid 36C within the reservoir 37C for all liquid levels. For example, the capacitor 38C may comprise a pair of parallel plates 101 and 102 which are preferably positioned so as to be completely immersed even when the level of the liquid drops to the lower end of the liquid level probe 32C. Since the same dielectric liquid appears between the plates of probes 38C and 32C, the probe 38C acts to compensate the circuit 100 for the dielectric constant of the liquid. More particularly, the influence of the dielectric constant of the liquid on the probes 32C and 38C will be the same and the capacitance of such probes will change by a corresponding amount when switched between reservoirs containing different kinds of liquids 36C. Hence, no adjustment of the circuit 100 is needed when the type of liquid is changed.

In theory, the use of shunt capacitance 38 of FIGURE 2 as a dielectric compensating liquid probe would be possible. However, in a practical situation, the size of a capacitive probe of the required large capacitance of the shunt capacitor 38 would be very large in comparison to the physical size of the probe 32, would be expensive to construct and cumbersome to handle. Should automatic dielectric constant compensation not be required, the general arrangement of the circuit of FIGURE 4 may still be desirable since it does allow a relatively small capacitance 38C to be used in the output leg of the bridge. Further, the current amplifier 106 may be selected to provide gain for driving a relatively insensitive phase detector.

Figure 5:
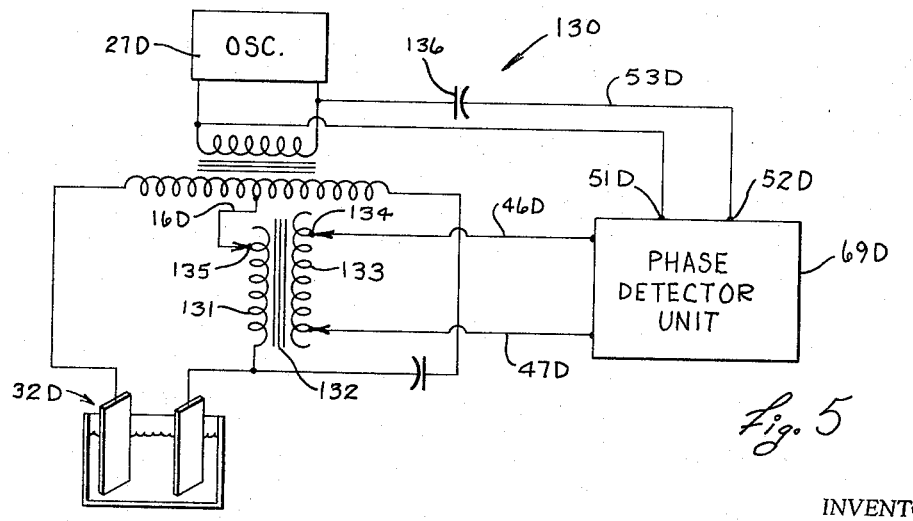
FIGURE 5 is a simplified circuit at least broadly embodying the invention and capable of providing some of the desirable features thereof.

FIGURE 5 discloses a further modified circuit 130. The circuit 130 is a simplified one which is capable of providing some but not all of the desirable attributes of the preferred circuits above described. Parts of the circuit 130 corresponding to the parts of the circuits 20 and 100 will carry the same reference numerals thereas with the suffix D added thereto. The capacitive shunt 38B, high input impedance amplifier 62 and low impedance phase detector 69 of FIGURE 3 are here replaced by a current transformer 132 and a low impedance phase detector 69D with an appropriately phase shifted reference signal. As a result, a cost saving may be effected by the use of the circuit 130. More specifically, the transformer 132 has a primary winding 131 forming the center leg 16D of the bridge. The current transformer and its load, as in the case of the capacitive shunt 38 described above must appear as a low impedance across the ends of the center leg 16D. The current transformer 132 has a secondary winding 133 which has suitable taps thereon as indicated at 134 selectably connectible to the signal input terminals of a simple phase detector unit 69D. The use of the current transformer 132 obviates the need for a high input impedance phase detector such as the generalized phase detector 41B.

If desired, a suitable tap 135 may be placed on the primary winding 131 of the transformer 132 which together with taps 134 on the secondary allows changes in the ratio of the current transformer. In addition, a capacitance or other phase shifting element 136 must be provided in the line 53D between the oscillator 27D and the reference side of the phase detector 69D in order that said phase detector measures the capacitive current component of the bridge. Such phasing capacitor will not be required, however, for conductance measurements in which the admittance $Y_1$ is some resistive probe.

The circuit 130 although capable of at least approximating a linear output given a transformer 132 of suitably low input primary impedance is less advantageous than above circuits in requiring the capacitor 136 in the line between the oscillator and phase detector. Further, no automatic dielectric compensation is possible in such circuit and continuous changes in the span adjustment are rendered difficult by the absence of a suitable amplifier such as the amplifier 62. However, the circuit of FIGURE 5 is believed to fall, at least broadly, within the scope of the invention.

Although particular preferred embodiments of the invention are disclosed for illustrative purposes, it will be apparent that variations or modifications thereof which lie within the scope of the appended claims are fully contemplated.

The embodiments of the invention in which an exclusive property or privilege is claimed are defined as follows:

1. A normally unbalanced bridge circuit for producing an output linearly related to an admittance change, comprising in combination:
   a first alternating voltage source and a first admittance in series therewith between a pair of points;
   a second alternating voltage source and a second admittance in series therewith between said pair of points, at least one of said admittances being variable to provide an admittance change to be measured;
   a phase sensitive, current sensing device having an input impedance of value negligible in comparison to the difference between said first and second admittances and connected as a current shunt between said points, the change in current flow through said shunt being a linear function of said admittance change to the extent that said shunt fails to impede current flow therethrough.

2. A circuit for producing an output linearly related to a change in the capacitance of a test probe, comprising in combination:
   four outside circuit legs connected as a closed path;
   an A.C. source and a transformer energized thereby, said transformer having secondaries comprising a pair of said legs;
   an admittance in another leg and means for connecting the test probe in the remaining leg;
   a shunt capacitor connected across one of said pair of legs and one of said another and remaining legs, said shunt capacitor being larger in capacitance than said variable test probe so that the voltage drop across said shunt capacitor is negligible compared to the voltage drop across said variable test probe, the current flow through said shunt capacitor being a measure of the bridge unbalance linearly related to the change in capacitance of said probe;
   a phase detector having signal input terminals connected across said shunt capacitor and having reference signal terminals connected across said A.C. source for detecting changes in the component of current flow through said shunt resulting from changes in the capacitance of the test probe and for rejecting quadrature components.

3. A circuit for producing an output linearly related to a change in the capacitance of a capacitive probe, comprising in combination:
   four outside legs connected as a closed path and an A.C. source and a transformer energized thereby, said transformer having secondaries comprising a pair of said legs;
   an admittance in another leg and means for connecting the variable test probe in the remaining leg;
   a current amplifier having input terminals connecting same as a shunt across one of said pair of legs and one of said another and remaining legs, said input terminals exhibiting an impedance which is negligible in comparison to the differential admittance of said admittance and said probe, the current flow through said input terminals being a measure of the bridge unbalance linearly related to the change in capacitance of said probe;
   a phase detector having signal input terminals fed by said amplifier and having reference signal terminals connected across said A.C. source for detecting changes in the component of current flow through said input terminals resulting from changes in the capacitance of the test probe and for rejecting quadrature components;
   a shunt capacitor across the input terminals of said phase detector for furnishing a voltage thereacross in response to passage of current therethrough from said amplifier, provision of said amplifier between said input terminals and said shunt capacitor allowing said shunt capacitor to be substantially smaller than would be required in the absence of said amplifier.

4. The device defined in claim 2, in which said test probe is a capacitive liquid level probe.

5. The device defined in claim 2, including an amplifier connected between said shunt capacitor and said phase detector for providing an output current to said phase detector as a result of current flow through said shunt capacitor which output current is independent of the load impedance presented by the detector to said amplifier.

6. The device defined in claim 3, in which said test probe is a liquid level probe and in which the shunt capacitor is a capacitive probe insertable in a liquid bath with said liquid level probe to render the signal furnished the phase detector independent of the dielectric constant of the liquid.

7. The device defined in claim 5, in which said amplifier has a high input impedance, such input impedance being substantially higher than the impedance of said shunt capacitor so as not to interfere with current flow through said capacitor.

8. The device defined in claim 1, in which said one admittance is a variable capacitor whose change in capacity is to be measured and in which said phase sensitive current sensing device includes a further capacitor connected across the ends of said center leg and having a large admittance compared to the change in admittance of said one admittance and said device further includes a phase detecting circuit having an input admittance which is low in comparison to the admittance of said further capacitor whereby the signal detected by the phase detector can be made a linear function of the change in said one admittance.

9. A circuit for producing an output linearly related to a change in the conductance of a test probe comprising in combination:
four outside circuit legs connected as a closed path;
an A.C. source and a transformer energized thereby, said transformer having a secondary comprising a pair of said legs;
an admittance in another leg and means for connecting the test probe in the remaining leg;
an output admittance connected across one of said pair of legs and one of said another and remaining legs, said output admittance being substantially larger in conductance than said variable test probe so that the voltage drop across said output admittance is negligible compared to the voltage drop across said variable test probe, the current flow through said output admittance being a measure of bridge imbalance and linearly related to the change in conductance of the test probe;
a phase detector having signal input terminals connected across said second admittance and having reference signal terminals energized by said A.C. source for detecting changes in the component of current flow through said shunt resulting from changes in the conductance of the test probe and for rejecting other components.

10. A normally unbalanced bridge circuit for producing an output linearly related to a change in the capacitance of a test probe, comprising in combination:
a rectangular network having four outside legs;
an A.C. source and means for impressing the output of said A.C. source on a pair of said legs;
means for connecting said test probe in a further one of said legs;
an admittance having a capacitive component connected in the last of said legs;
a current transformer having a low impedance primary winding connected diagonally of said network in a manner to shunt one of said pair of legs and said test probe, said current transformer having a secondary winding inductively coupled to said primary winding;
a phase detector circuit having signal input terminals connected to said secondary winding and having a pair of reference signal input terminals;
means connecting said reference signal input terminals to the output of said A.C. source for providing a 90° phase shift in the A.C. source output before applying same to said reference signal input terminal;
whereby the reference signal applied to the phase detector is in quadrature phase relationship with a component of the voltage applied to the signal input terminals thereof which component is related to changes in the capacitance of the test probe.

11. The device defined in claim 3, in which said admittance in said another leg is an adjustable capacitor for changing the value of the capacitance of the test probe at which the current flow through the shunt capacitor is zero.

12. The device defined in claim 1, in which said phase sensitive current sensitive device includes gain determining means adjustable for changing the scale of the output of phase sensitive current sensing device with respect to a given change in the capacity of said one of said admittances.

13. A normally unbalanced bridge circuit for producing an output linearly related to a change in the conductance of a test probe, comprising in combination:
a bridge network having four outside legs;
an A.C. source and means for impressing the output of said A.C. source on a pair of said legs;
means for connecting said test probe in a further one of said legs;
an admittance connected in the last of said legs;
a current transformer having a low impedance primary winding connected diagonally of said bridge in a manner to shunt one of said pair of legs and said test probe, said current transformer having a secondary winding inductively coupled to said primary winding;
a phase detector circuit having signal input terminals connected to said secondary winding and having a pair of reference signal input terminals;
means connecting said reference signal input terminals to the output of said A.C. source;
whereby the reference signal applied to the phase detector is in phase with a component of the voltage applied to the signal input terminals thereof which component is related to changes in the capacitance of the test probe.

References Cited

UNITED STATES PATENTS

| | | | |
|---|---|---|---|
| 2,976,727 | 3/1961 | Prigozy | 73—304 |
| 3,249,833 | 5/1966 | Vosteen | 73—398 XR |

DAVID SCHONBERG, *Primary Examiner.*

DONALD O. WOODIEL, *Assistant Examiner.*